June 14, 1932.  W. V. SPROLES  1,863,288
SELF WEIGHING BIN
Filed Jan. 18, 1930  2 Sheets-Sheet 1
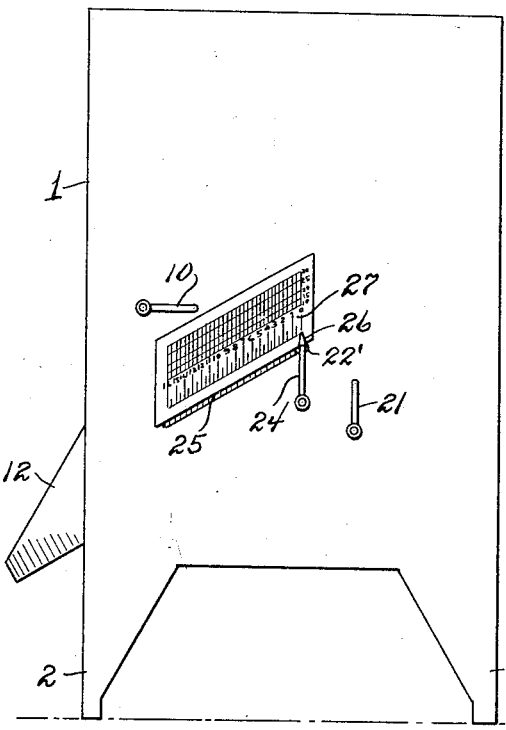
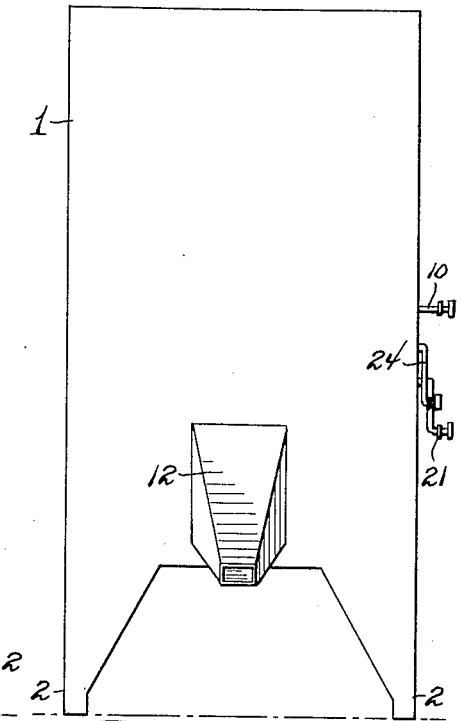
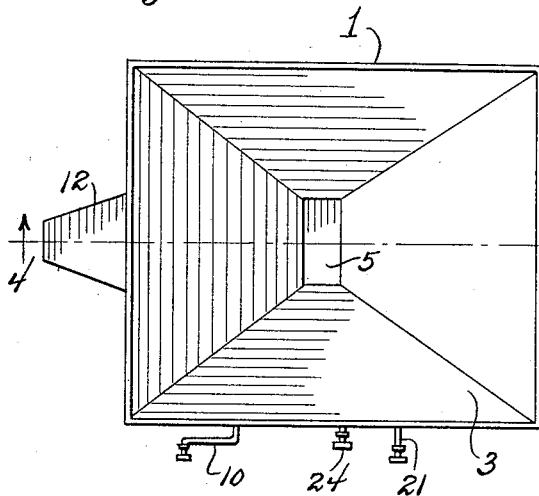
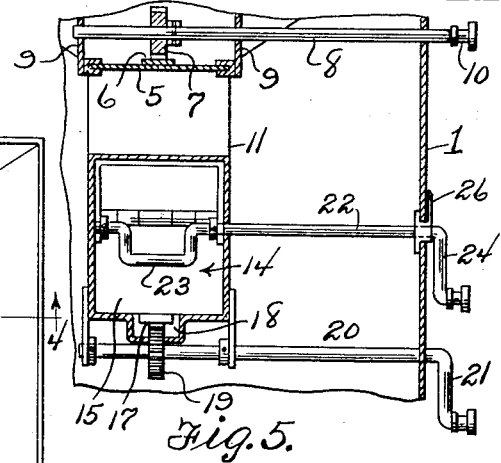
William V. Sproles
INVENTOR
BY Victor J. Evans
ATTORNEY June 14, 1932.  W. V. SPROLES  1,863,288
SELF WEIGHING BIN
Filed Jan. 18, 1930   2 Sheets-Sheet 2
Fig. 4.
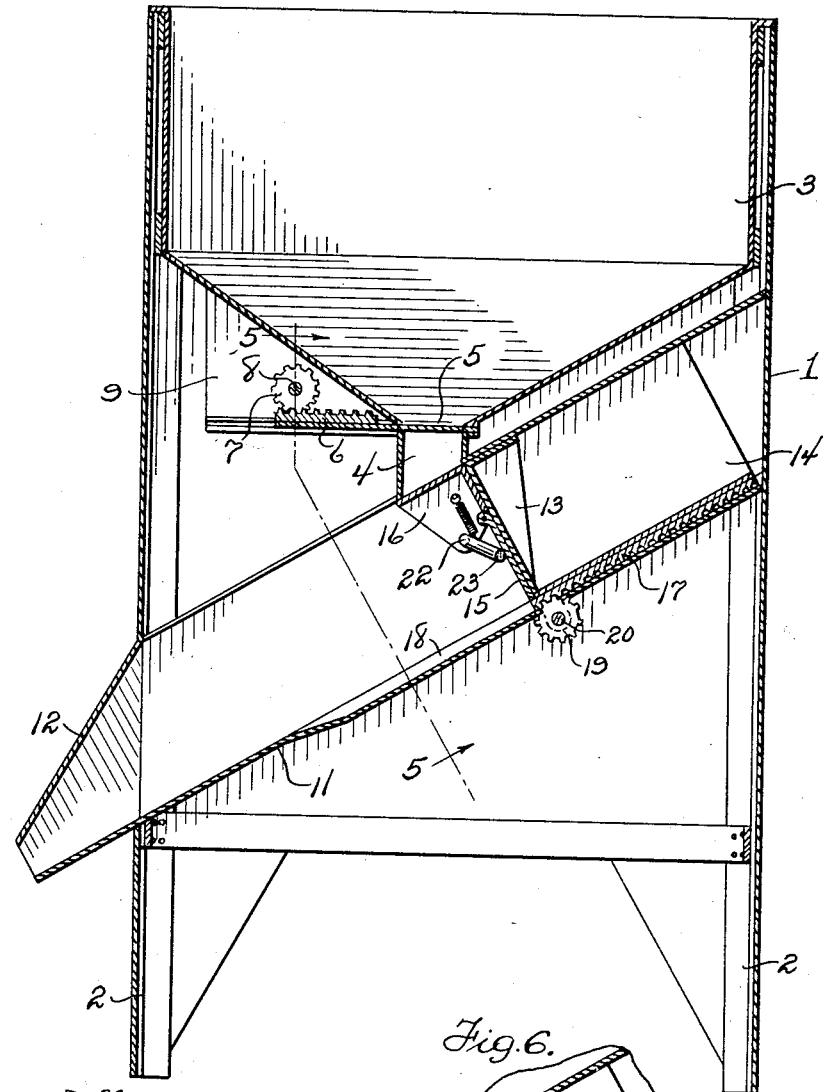
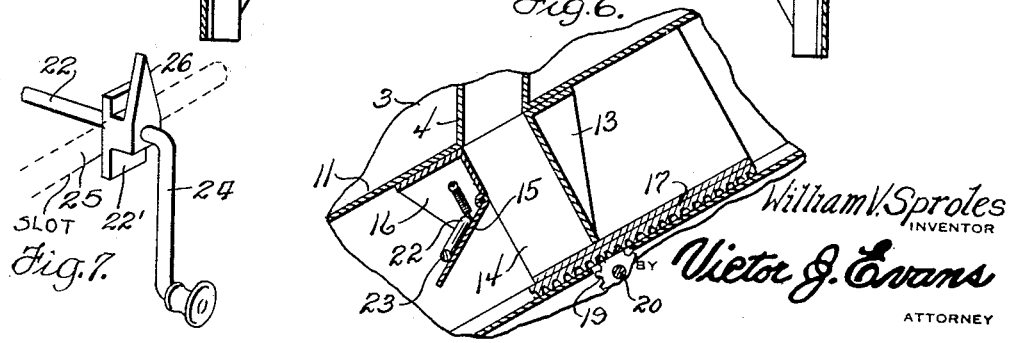
William V. Sproles
INVENTOR
Victor J. Evans
ATTORNEY Patented June 14, 1932

1,863,288

UNITED STATES PATENT OFFICE

WILLIAM V. SPROLES, OF LA FERIA, TEXAS

SELF-WEIGHING BIN

Application filed January 18, 1930. Serial No. 421,744.

This invention relates to a self-weighing bin, the general object of the invention being to provide a slidable container arranged in a discharge spout and receiving material from a hopper, with means for adjusting the container so as to receive varying amounts of material from the hopper so that the amount of material required can be removed from the bin by properly adjusting the container.

Another object of the invention is to provide a manually operated gate for controlling the flow of material from the hopper and a manually operated door for discharging the material from the container.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of the device.
Figure 2 is a front view thereof.
Figure 3 is a top plan view.
Figure 4 is a section on line 4—4 of Figure 3.
Figure 5 is a section on line 5—5 of Figure 4.
Figure 6 is a vertical sectional view showing the sliding container in adjusted position and with its door open.
Figure 7 is a fragmentary perspective view showing in detail the mounting of a runner and shaft therein.

In these views, the numeral 1 indicates a casing which may be placed on a counter or the like, but when the device is of large size, the casing is provided with the legs 2. A hopper 3 is located in the upper part of the container and has its bottom sloping to a discharge spout 4. A sliding gate 5 controls the flow of material through the spout, this gate having a rack 6 thereon which is engaged by a sprocket 7 carried by a shaft 8 which is journaled in the supports 9 and has one end passing through one side of the casing, where it is provided with a handle 10.

A diagonally arranged discharge chute 11 is arranged in the casing below the hopper and has an opening in its top which registers with the spout 4. This chute is formed with a discharge spout 12 at the front of the casing. A partition member 13 is placed in the spout with its upper forward edge in alignment with the rear wall of the spout 4. A container 14 is slidably arranged in the chute and consists of two side walls, a bottom and a front, the front having an opening therein which is closed by a door 15 hinged to the front at its upper edge. The container is provided at its upper part with a forwardly extending part 16 which will close the spout 4 when the front of the container is in contact with a partition 3. A rack 17 is connected with the bottom of the container 14 and operates in a groove 18 formed in the bottom of the chute 11 and this rack is engaged by a sprocket 19 carried by a shaft 20, one end of which passes through one side of the casing, where it is provided with a handle 21. Thus by rotating the shaft, the container can be moved in the chute 11.

A shaft 22 is carried by the container and has a crank part 23 connected with the door, with one end of the shaft passing through the casing, where it is provided with a handle 24. This shaft passes through a suitable runner 22 in a slot 25 in the casing and this runner carries a finger 26 on its outer part which will move over a chart 27 on the casing when the container 14 is moved, the finger and chart indicating the amount of material which will drop into the container when the same has been moved to a certain extent.

From the foregoing it will be seen that when the parts are in the position shown in Figure 4, no material can enter the container. Then when a certain amount of material is required, the shaft 20 is turned by its handle 21 so as to move the container downwardly in the chute, and this is continued until the finger 26 reaches the mark on the chart which indicates the amount of material desired. This movement of the container will move the part 16 away from the lower end of the chute or spout 4 and then by opening the gate 5 by means of the shaft 8, material will flow from the hopper into the container to fill the space thereof which is formed by the front end door of the container and the partition 13. Then the gate 5 is closed and the door 15 is opened by turning the shaft 22, so that the material will discharge from the container and flow down the chute 11 into a receptacle placed under the spout 12 to receive the same.

By adjusting the charts, the device can be used with different kinds of material.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a casing, a hopper in the upper end thereof, a diagonally arranged chute in the casing under the hopper and having an opening in its top registering with the discharge end of the hopper, a partition in the chute immediately in rear of the opening therein, a container slidably arranged in the chute and having a door in its front end, manually operated means for adjusting the container in the chute to space its front end varying distances from the partition or to place said front end against the partition, a front extension at the top of the container for closing the hopper discharge when the front end of the container is against the partition, means for indicating the distance the container must be adjusted to receive a certain amount of material and manually operated means for opening the door.

In testimony whereof I affix my signature.

WILLIAM V. SPROLES.